United States Patent
Kato et al.

(10) Patent No.: US 12,263,866 B2
(45) Date of Patent: Apr. 1, 2025

(54) VEHICLE MANAGEMENT SYSTEM

(71) Applicant: TOYOTA JIDOSHA KABUSHIKI KAISHA, Toyota (JP)

(72) Inventors: Yukinari Kato, Okazaki (JP); Shintaro Matsutani, Kariya (JP); Keiichi Uno, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 149 days.

(21) Appl. No.: 18/135,891

(22) Filed: Apr. 18, 2023

(65) Prior Publication Data

US 2023/0415770 A1    Dec. 28, 2023

(30) Foreign Application Priority Data

Jun. 28, 2022    (JP) .................................. 2022-103485

(51) Int. Cl.
*B60W 60/00*    (2020.01)

(52) U.S. Cl.
CPC ....... *B60W 60/001* (2020.02); *B60W 2756/10* (2020.02)

(58) Field of Classification Search
CPC .................. B60W 60/001; B60W 2756/10
USPC ......................................................... 701/24
See application file for complete search history.

(56) References Cited

U.S. PATENT DOCUMENTS

| | | | |
|---|---|---|---|
| 10,372,130 B1* | 8/2019 | Kaushansky | B60W 60/001 |
| 2018/0046182 A1* | 2/2018 | Joyce | G01C 21/3453 |
| 2018/0194356 A1* | 7/2018 | Richards | B60W 60/0023 |
| 2019/0184959 A1* | 6/2019 | Cao | G06V 40/10 |
| 2019/0250617 A1* | 8/2019 | Ford | G05D 1/0212 |
| 2019/0271982 A1 | 9/2019 | Watanabe et al. | |
| 2019/0315342 A1* | 10/2019 | Bertollini | G05D 1/0088 |
| 2021/0406570 A1* | 12/2021 | Bielby | G06F 18/254 |
| 2023/0394443 A1* | 12/2023 | Kato | G07C 5/006 |

FOREIGN PATENT DOCUMENTS

| | | | | |
|---|---|---|---|---|
| JP | 2019-151177 A | | 9/2019 | |
| WO | WO-2016197068 A1 * | | 12/2016 | A61B 5/4023 |

* cited by examiner

*Primary Examiner* — Hussein Elchanti
*Assistant Examiner* — Kenneth M Dunne
(74) *Attorney, Agent, or Firm* — Dinsmore & Shohl LLP

(57) ABSTRACT

A management server executes a process including: a step of acquiring operation information when an execution condition is established; a step of setting a traveling route; a step of calculating an accumulated amount of load when there is a vehicle set on the forwarding route; a step of setting the details of canceling the travel restriction according to the accumulated amount of the load of the vehicle on the forwarding route when there is a vehicle in a high accumulated state; a step of setting cancellation of travel restrictions for vehicles on the forwarding route when there is no vehicle in a high accumulation state; and a step of transmitting the travel plan information.

4 Claims, 4 Drawing Sheets

VEHICLE MANAGEMENT SYSTEM

CROSS-REFERENCE TO RELATED APPLICATION

This application claims priority to Japanese Patent Application No. 2022-103485 filed on Jun. 28, 2022, incorporated herein by reference in its entirety.

BACKGROUND

1. Technical Field

The present disclosure relates to a vehicle management system.

2. Description of Related Art

When an autonomous driving vehicle is used to provide transportation services, etc., it is possible to shorten the travel time of the vehicle by changing the control of acceleration and deceleration depending on whether a user of the service is on board.

For example, Japanese Unexamined Patent Application Publication No. 2019-151177 (JP 2019-151177 A) discloses a technique for shortening the travel time by rapidly accelerating or decelerating the vehicle when there is no occupant on board the vehicle.

SUMMARY

However, when sudden acceleration or deceleration is performed when there are no users on board, the load on the vehicle is increased, the time required for the next maintenance, etc. is shortened, and there is a case in which the time during which services cannot be provided is increased and a possibility that a failure occurs is increased.

The present disclosure has been made to solve the above-described problems, and an object thereof is to provide a vehicle management system that suppresses an increase in a possibility of an occurrence of a failure of a vehicle used to provide the services.

A vehicle management system according to an aspect of the present disclosure includes a vehicle that is able to perform autonomous driving and that is used to provide a transportation service and a server that is able to communicate with the vehicle. The server requests a predetermined travel restriction for the vehicle during the autonomous driving when a user of the transportation service is on board. The server requests a cancellation of the travel restriction when the user is not on board. The server calculates an accumulated amount of a load acting on the vehicle, and uses the calculated accumulated amount to set content of the cancellation of the travel restriction that is requested when the user is not on board.

In this way, the travel restriction can be canceled in accordance with the accumulated amount of the load. Therefore, it is possible to suppress a further increase in the accumulated amount of the load, thereby suppressing an increase in the possibility of an occurrence of a failure.

In one embodiment, when the accumulated amount is high, the server sets the content of the cancellation of the travel restriction such that the travel restriction is maintained more than when the accumulated amount is low.

In this way, since the content of the cancellation is set such that the travel restriction is maintained when the accumulated amount of the load is high, it is possible to further suppress an increase in the accumulated amount of the load. As a result, it is possible to suppress an increase in the possibility of an occurrence of a failure.

Further, in an embodiment, when a state is a predetermined state in which the accumulated amount of the vehicle is high, the server does not request the cancellation of the travel restriction even when the user is not on board.

By doing so, it is possible to further suppress an increase in the accumulated amount of the load. As a result, it is possible to suppress an increase in the possibility of an occurrence of a failure.

Furthermore, in one embodiment, the server requests the cancellation of the travel restriction when the user is not on board with respect to the vehicle traveling on a predetermined traveling route including a place where maintenance of the vehicle is performed.

In this way, the vehicle can be quickly moved to the place where maintenance is to be performed. Therefore, it is possible to suppress an increase in the time during which the service cannot be provided.

Moreover, in an embodiment, the travel restriction includes at least one of a restriction of a driving force of the vehicle, a restriction of a braking force of the vehicle, and a restriction of a steering force of the vehicle.

By doing so, it is possible to suppress the deterioration of the ride comfort of the vehicle by implementing any of the travel restrictions while the user is on board the vehicle.

Moreover, in an embodiment, the server calculates the accumulated amount by using at least one of a travel distance of the vehicle, a travel time of the vehicle, the number of passengers in the vehicle, a travel distance until a next maintenance is performed, and a travel time until the next maintenance is performed.

In this way, the accumulated amount of the load of the vehicle can be calculated with high accuracy by using the travel history, the maintenance history, and the like of the vehicle.

According to the present disclosure, it is possible to provide a vehicle management system that suppresses an increase in the possibility of a failure occurring in a vehicle used to provide services.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
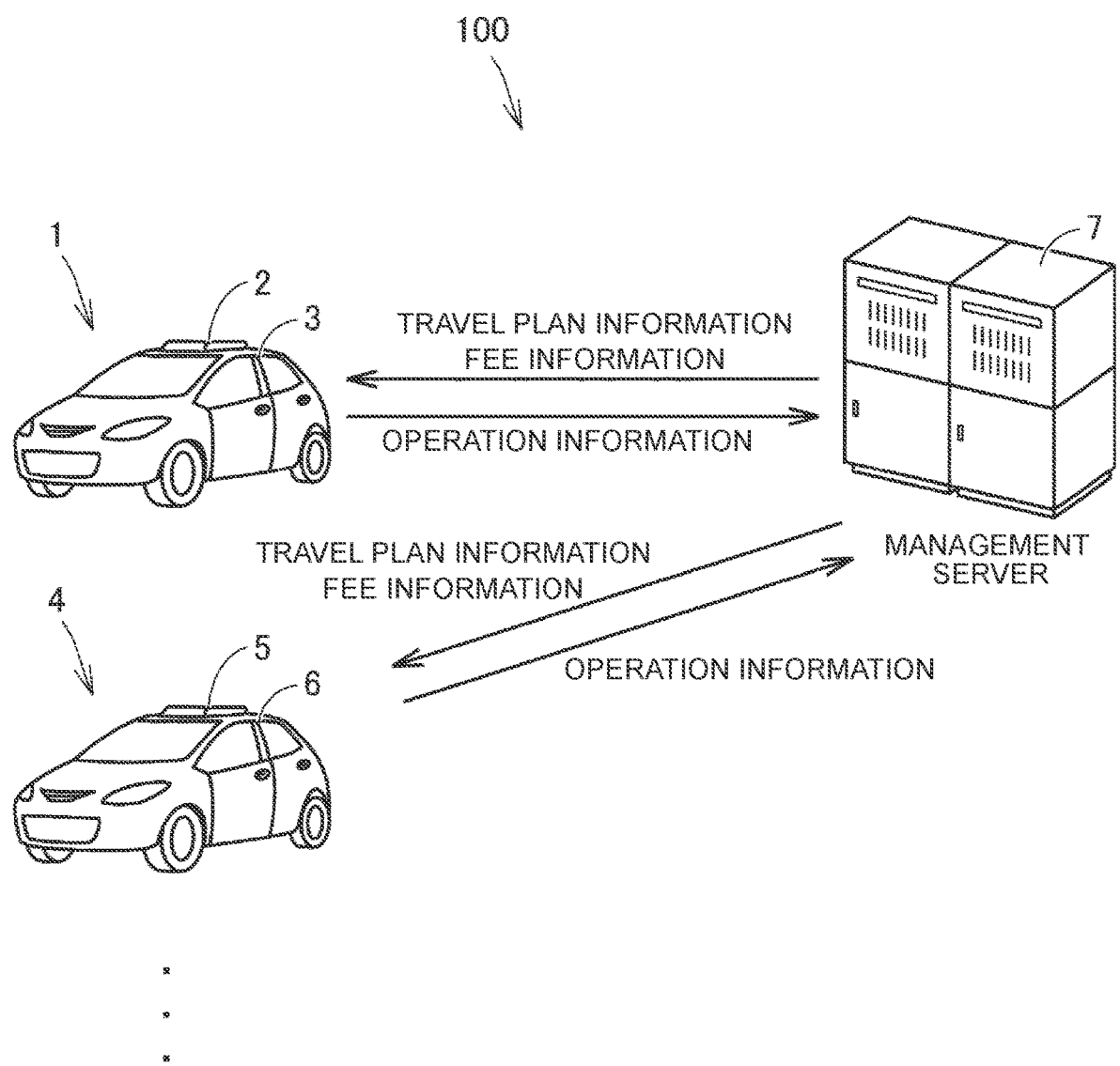
FIG. 1 is a diagram schematically showing an overall configuration of a vehicle management system.

Hereinafter, an embodiment of the present disclosure will be described in detail with reference to the drawings. In the drawings, the same or corresponding portions are denoted by the same reference signs and the description thereof will not be repeated.

FIG. 1 is a diagram schematically showing an overall configuration of a vehicle management system 100. The vehicle management system 100 manages a plurality of vehicles. In practice, many vehicles can be managed by the vehicle management system 100, but for convenience of explanation, a case where specific vehicles 1 and 4 are managed by the vehicle management system 100 will be described below as an example. The vehicle management system 100 includes the vehicles 1 and 4 and a management server 7. The vehicle 1 includes an autonomous driving kit (ADK) 2 and a vehicle platform (VP) 3. Similarly, the vehicle 4 includes an ADK 5 and a VP 6.

The users of the vehicles 1 and 4 may be, for example, businesses that provide transportation services by autonomous driving by using the vehicles 1 and 4 (bus businesses, taxi businesses, rental car businesses, car sharing businesses, or ride sharing services business operators, etc.). In the present embodiment, it is assumed that users of the vehicles 1 and 4 are, for example, business operators who own a plurality of vehicles and provide personnel transportation services. A transportation service for people is, for example, driving a vehicle along multiple traveling routes (such as traveling route that passes through an urban area and a traveling route that passes through a mountainous area), and having people load and alight at a predetermined boarding/alighting point provided on the traveling routes while moving so as to arrive at the predetermined boarding/alighting point set on the traveling route at a predetermined set time, and charging a usage fee. In the present embodiment, for convenience of explanation, the plurality of traveling routes is set to include the forwarding route including the location of the maintenance facility and the normal route that circulates through a plurality of predetermined boarding/alighting points without going through the maintenance facility.

An example of a configuration for autonomous driving will be described below, with the vehicle 1 serving as an example. The ADK 2 mounted on the vehicle 1 is configured to be attachable to the VP 3 of the vehicle 1 and detachable from the VP 3. The ADK 2 is attached to a predetermined position such as the rooftop of VP 3, for example.

The ADK 2 is configured to enable autonomous driving of the vehicle 1. Specifically, the ADK 2 creates a travel plan for the vehicle 1. The ADK 2 outputs various control requests for causing the vehicle 1 to travel in accordance with the travel plan to the VP 3, following an application program interface (API) defined for each control request. The ADK 2 also receives various signals indicating the vehicle state (state of VP 3) from the VP 3 in accordance with an API defined for each signal. The ADK 2 then reflects the vehicle state on the travel plan. The ADK 2 may create a travel plan using the travel plan information from the management server 7, for example.

The VP 3 executes traveling control in the autonomous driving mode according to the control request from ADK 2. When the ADK 2 is removed from the VP 3, the VP 3 is configured to be able to execute a traveling control in manual mode (a traveling control according to the driver's operation).

The VP 3 transmits various types of information (operation information and the like, which will be described later) to the management server 7 in the vehicle management system 100.

The management server 7 may be a company's own server, a shared server shared by a plurality of companies including the above company, or a cloud server provided by a cloud server management company.

The management server 7 is, for example, a server operated by an operator who maintains and manages a plurality of vehicles including the vehicle 1. The business operator may be, for example, the VP 3 manufacturer or the ADK 2 manufacturer. Furthermore, the management server 7 may be configured to include a server operated by the manufacturer of VP 3 and the server operating ADK 2. In the following description, an example in which the management server 7 is configured of one server will be described.

The management server 7 is configured to be able to receive operation information from each of the vehicles 1 and 4. The operation information of the vehicles 1 and 4 includes information that can identify the vehicles 1 and 4 such as license plate numbers and manufacturing numbers, (hereinafter referred to as a vehicle ID), information on a driving history (hereinafter referred to as history information), and information on maintenance of the vehicles 1 and 4 (hereinafter referred to as maintenance information). The management server 7 includes a database (not shown) for storing operation information received from at least one of the vehicles 1 and 4 in a format that allows identification of the vehicle that sent the information. The management server 7 generates the travel plan information and fee information by using the received operation information, and transmits them to the vehicles 1 and 4.

In the present disclosure, "maintenance" of a vehicle means all actions for maintaining the vehicle in a normal state and restoring the vehicle from an abnormal state to a normal state. Maintenance may include inspection, repair, adjustment, or replacement of any part provided on the vehicle. The maintenance information may include, for example, information for diagnosing whether maintenance is required, such as a mileage after maintenance of a part that is the maintenance target, a mileage until a next maintenance of the part, and the like, and may include information indicating a diagnosis result as to whether maintenance is required.

Figure 2:
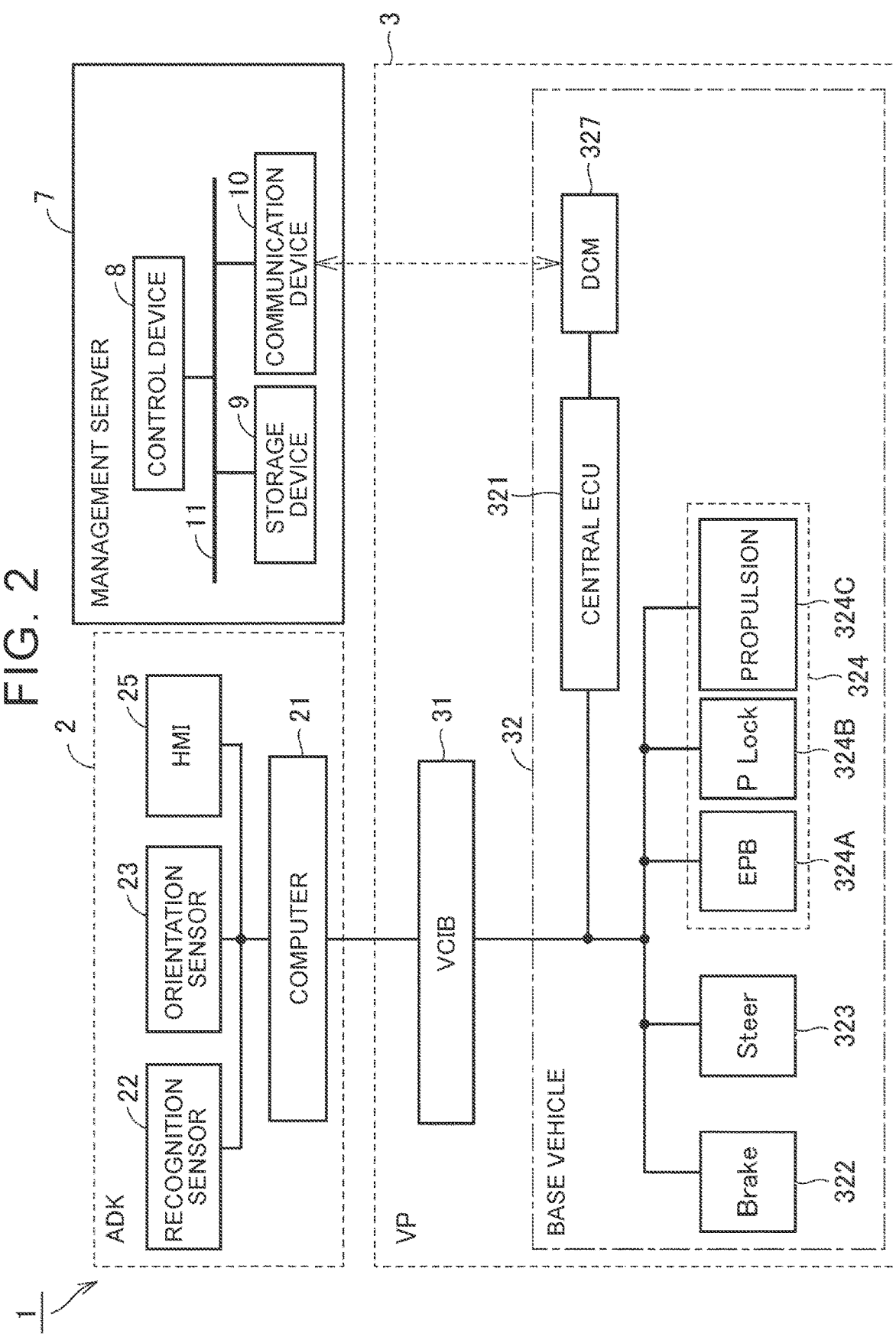
FIG. 2 is a diagram showing an example of a configuration of an autonomous driving kit (ADK) and a vehicle platform (VP) in more detail.

FIG. 2 is a diagram showing an example of a configuration of the ADK 2 and the VP 3 in more detail. The ADK 2 includes a computer 21, a recognition sensor 22, an orientation sensor 23, and a human machine interface (HMI) 25.

The VP 3 includes a vehicle control interface box (VCIB) 31 and a base vehicle 32. The base vehicle 32 includes a central electronic control unit (ECU) 321, a braking system 322, a steering system 323, a powertrain system 324, and a digital communication module (DCM) 327.

The powertrain system 324 includes an electric parking brake (EPB) system 324A, a parking lock (P-lock) system 324B, and a propulsion system 324C.

The computer 21 acquires data regarding the environment of the vehicle 1 by using the recognition sensor 22 during autonomous driving of the vehicle 1. In addition, the computer 21 acquires data on the orientation, behavior and position of the vehicle 1 by using orientation sensor 23 during autonomous driving of the vehicle 1. Furthermore, the computer 21 is communicably connected to the VCIB 31. The computer 21 acquires the vehicle state from the VP 3 via the VCIB 31 and sets the next operation (acceleration, deceleration, turning, etc.) of the vehicle 1. The computer 21 outputs various commands to the VP 3 via the VCIB 31 to implement the following operations.

The recognition sensor 22 is a sensor for recognizing the environment of the vehicle 1. The recognition sensor 22 includes, for example, at least one of a laser imaging detection and ranging (LIDAR), a millimeter wave radar, and a camera (all not shown). The LIDAR emits, for example, infrared pulsed laser light and measures the distance and the direction of an object by detecting the reflected light of the laser light from the object. The millimeter wave radar measures the distance and the direction of an object by emitting millimeter waves and detecting the reflected waves of the millimeter waves from the object. The camera captures an image ahead of the vehicle 1.

The orientation sensor 23 is a sensor for detecting the orientation, behavior, and position of the vehicle 1. The orientation sensor 23 includes, for example, an inertial measurement unit (IMU) and a position detection device such as a global positioning system (GPS) (both not shown). The IMU detects, for example, the longitudinal, lateral, and vertical accelerations of the vehicle 1 and the angular velocities of the vehicle 1 in the roll, pitch, and yaw directions. The GPS locates the vehicle 1 using information received from multiple GPS satellites orbiting the earth.

The HMI 25 is configured to be connected to an input/output device (not shown) such as a touch panel display provided on the base vehicle 32, for example.

The VCIB 31 is communicably connected to the ADK 2 through controller area network (CAN) or the like. The VCIB 31 receives various control requests from the ADK 2 and outputs the vehicle state to the ADK 2 by executing a predetermined API defined for each signal. Upon receiving a control request from the ADK 2, the VCIB 31 outputs a control command corresponding to the control request to a system (for example, a braking system 322, a steering system 323, and a powertrain system 324) corresponding to the control command. Also, the VCIB 31 acquires various types of information about the vehicle state (the state of the base vehicle 32) and outputs the acquired information to the ADK 2.

The central ECU 321 transmits various information indicating the vehicle state to the management server 7 and various requests to the management server 7, via the DCM 327. The central ECU 321 also receives commands or notifications from the management server 7 via the DCM 327. Further, the central ECU 321 uses the vehicle state acquired from each system of the VP 3 to diagnose whether maintenance is required in the VP 3, or receives the diagnosis result of the self-diagnosis performed in each system of the VP 3 to use the received diagnosis result so as to diagnose whether the state is such that maintenance is required in the VP 3.

In the present embodiment, the central ECU 321 will be described as an executing entity of diagnostic processing for diagnosing whether maintenance of the vehicle 1 is required. However, in addition to the above function, the central ECU 321 may have a function (gateway function) such as relaying communication between ECUs included in each system.

The braking system 322 is configured to control braking force that uses braking devices (not shown) provided on each wheel of the base vehicle 32. The steering system 323 is configured to control a steering angle (steering force) of steered wheels of the vehicle 1 using a steering device (not shown).

The EPB system 324A controls an EPB (not shown) provided on at least one of the wheels following a control request transmitted from the ADK 2 via the VCIB 31. The P-lock system 324B controls a P-lock device (not shown) provided in the transmission following a control request transmitted from the ADK 2 through the VCIB 31. The propulsion system 324C controls a driving force from a drive source (such as a motor generator and an engine, which are not shown) following the control request/requirement from the ADK 2.

The DCM 327 is an in-vehicle communication module. The DCM 327 is configured to enable two-way data communication between the central ECU 321 and the management server 7.

The ADK 5 of the vehicle 4 has the same configuration as the ADK 2 of the vehicle 1. Furthermore, the VP 6 of the vehicle 4 has the same configuration as the VP 3 of the vehicle 1. Therefore, detailed descriptions thereof will not be repeated.

The management server 7 includes a control device 8, a storage device 9 and a communication device 10. The control device 8, the storage device 9, and the communication device 10 are communicably connected to each other via a communication bus 11.

The control device 8 includes a central processing unit (CPU), a memory (read only memory (ROM), a random access memory (RAM), etc.), input/output ports for inputting and outputting various signals, etc., although none of them are shown. Various controls that are executed by the control device 8 are executed by software processing, that is, programs stored in the memory are read out by the CPU. The various controls by the control device 8 can also be realized by a general-purpose computer (not shown) executing a program stored in a storage medium. The various controls by the control device 8 are not limited to software processing, and may be processed by dedicated hardware (electronic circuits).

The storage device 9 stores operation information received from the vehicles 1 and 4 configured to be able to communicate with the management server 7.

The communication device 10 realizes two-way communication between the vehicles 1 and 4 and a communication network (not shown). The management server 7 enables a plurality of vehicles including the vehicles 1 and 4 to communicate with each other via a base station (not shown) provided in a communication network by using the communication device 10.

In the vehicle management system 100 having the configuration described above, for example, the management server 7 sets a traveling route indicating route information on which each of the vehicles 1 and 4 travels, and transmits travel plan information to each of the vehicles 1 and 4 so as to arrive at or depart from boarding/alighting points on the set traveling route at preset times. Furthermore, the management server 7 transmits to the vehicles 1 and 4, information about the usage fee of the vehicle on the set traveling route as fee information.

In each of the vehicles 1 and 4, autonomous driving is carried out following the travel plan information, fee information is presented to the user by using a display device or the like, and settlement processing is executed in accordance with the time of use by the user. In this way, in each of the vehicles 1 and 4, the user gets on and off at the boarding/alighting points, and the transportation service for the personnel moving on the traveling route is provided.

When a plurality of vehicles, including the vehicles 1 and 4, are used to provide personnel transportation services, maintenance of the vehicles 1 and 4 is performed on a regular basis.

For example, whether maintenance of the vehicles 1 and 4 is necessary is determined by diagnosing whether each of the vehicles 1 and 4 is in a state requiring maintenance in the vehicles 1 and 4 or management server 7.

Cases of diagnosing whether the vehicle 1 is in a state requiring maintenance include when a usage period of a diagnostic target part exceeds a threshold from the time of the last replacement, when an amount of consumption of the diagnostic target part since the last replacement exceeds a threshold, when an error code of the diagnostic target part is output, or when an output value of the diagnostic target part becomes abnormal.

For example, when the usage period of various oils used in the engine, the motor generator, etc. from the time of the previous replacement exceeds a threshold set in accordance with the type of oil, the diagnosis is that maintenance for oil replacement is required. Alternatively, when an amount of wear of the brake pads included in the braking device exceeds a threshold value, it is diagnosed that maintenance for replacement of the brake pads is required. Alternatively, when a predetermined error code is output from equipment related to the driving operation of the vehicle 1, such as the engine and the motor generator, it is diagnosed that inspection and maintenance are required. Alternatively, when output values of various sensors exceed a normal range, it is diagnosed that maintenance such as sensor replacement or adjustment is required.

These determinations are made using the diagnostic results of self-diagnostic processing executed in the vehicle 1. The self-diagnostic process is executed, for example, by the computer 21 of the ADK 2 or the central ECU 321 of the VP 3. Alternatively, the management server 7 may manage information about the maintenance history of the vehicles 1 and 4, execute diagnostic processing by using the managed information, and use the diagnostic result to determined whether maintenance is required.

In the vehicles 1 and 4 as described above, when the vehicle is used to provide transportation services, etc., during autonomous driving, the travel time can be shortened by changing the acceleration/deceleration control in accordance with the presence or absence of the service user's boarding.

For example, when the user of the transportation service is on board, the management server 7 requests the vehicles 1 and 4 under autonomous driving to limit traveling in advance. The predetermined traveling limit includes, for example, at least one of a limit on the driving force of the vehicle, a limit on the braking force of the vehicle, and a limit on the steering force of the vehicle.

In addition, the management server 7 receives, for example, information indicating whether a user is riding the vehicle from each of the vehicles 1 and 4 during autonomous driving. The management server 7 may receive, for example, image data obtained by photographing the interior of vehicles 1 and 4, or may receive data indicating detection results from a seating sensor (not shown). For example, the management server 7 may determine whether the user is in the vehicle by performing image processing on the image data in which the interior is photographed. Alternatively, the management server 7 may determine whether the user is riding the vehicle, for example, by using data indicating the detection result from the seating sensor.

For example, when the user is riding the vehicle, the management server 7 sets a predetermined upper limit value for the magnitude of change in at least one of the driving force, the braking force, and the steering force of the vehicles 1 and 4, and requests the travel restriction with respect to the vehicle.

The management server 7 transmits, to the vehicles 1 and 4, the travel plan information including information about the travel restriction request. When the vehicles 1 and 4 receive the travel restriction request, the corresponding force among the driving force, the braking force, and the steering force is controlled so that a magnitude of change of at least one of the driving force, the braking force, and the steering force does not exceed the upper limit value when the user is riding the vehicle, thereby suppressing an occurrence of sudden changes in behavior in each of the vehicles 1 and 4. Thus, the deterioration of the ride comfort of the vehicles 1 and 4 can be suppressed.

On the other hand, the management server 7 requests the cancellation of the travel restrictions when the user is not riding the vehicle (for example, when the user is traveling on the forwarding route to the maintenance facility).

The management server 7 transmits, to the vehicles 1 and 4, the travel plan information including information about the travel restriction cancel request. When the vehicle 1 or 4 receives the travel restriction cancel request, when the user is not riding the vehicle, the vehicle 1 or 4 cancels the set upper limit value for at least one of the driving force, the braking force, and the operating force (for example, reset the upper limit to the initial value). By canceling the travel restriction, the vehicles 1 and 4 can be quickly moved to the destination (for example, a maintenance facility).

However, when the traveling restriction is canceled and sudden acceleration or deceleration becomes possible when there are no passengers on board, the load on the vehicle is increased, the time required for the next maintenance, etc. is shortened, and there is a case in which the time during which services cannot be provided is increased and a possibility that a failure occurs is increased.

Thus, in the present embodiment, the management server 7 calculates the accumulated amount of load acting on each of the vehicles 1 and 4, and uses the calculated accumulated amount to set the content of the cancellation of the driving restrictions requested when the user is not riding the vehicle. More specifically, when the accumulated amount is high, the management server 7 sets the content of the cancellation of the travel restriction so that the travel restriction is maintained more than when the accumulated amount is low.

In this way, the travel restriction can be canceled in accordance with the amount of the accumulated amount of the load on the vehicle. In particular, since the content of the cancellation is set so that the travel restriction is maintained when the accumulated amount of the load is high, it is possible to further suppress an increase in the accumulated amount of the load. As a result, it is possible to suppress an increase in the possibility of an occurrence of a failure.

Figure 3:
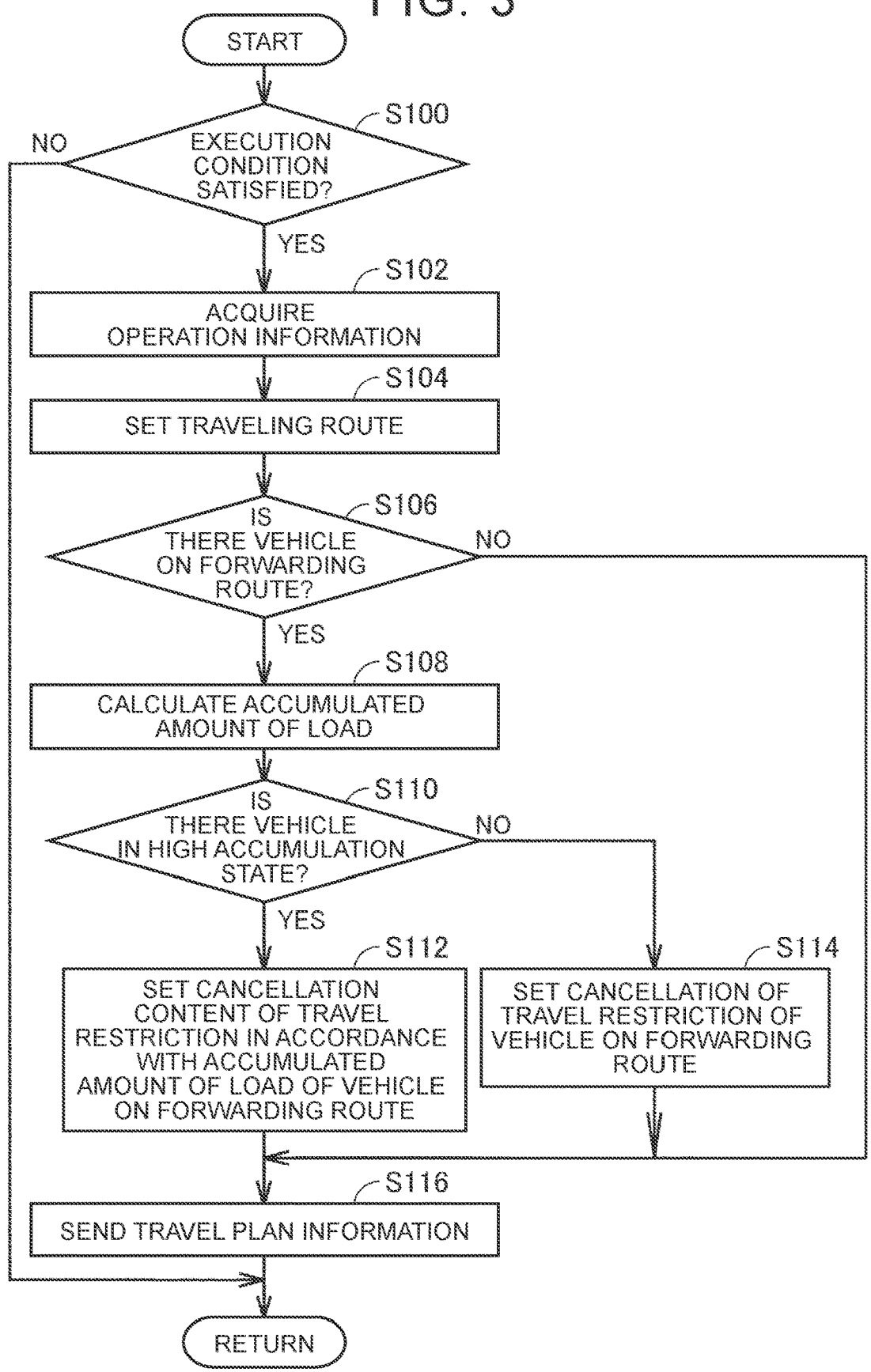
FIG. 3 is a flowchart showing an example of a process executed by a management server.

An example of processing executed in the management server 7 will be described below with reference to FIG. 3. FIG. 3 is a flowchart showing an example of a process executed by the management server 7. A series of processes shown in this flowchart are repeatedly executed by the management server 7 at predetermined intervals.

At step (hereinafter, a step is referred to as S) 100, the management server 7 (more specifically, the control device 8 of the management server 7) determines whether an execution condition for executing the process of generating the travel plan information is satisfied. For example, the execution condition may include a condition that a predetermined period of time has elapsed since a previous travel plan information was generated, may include a condition that it is a time zone other than a time zone during which the service is provided, may include a condition that a predetermined period of time has elapsed since a previous traveling route was set, may include a condition that maintenance is required in any one of the plurality of vehicles including the vehicles 1 and 4, or may include a condition that the state is predicted. When it is determined that the execution condition is satisfied (YES at S100), the process proceeds to S102.

In S102, the management server 7 acquires the operation information. The management server 7 acquires the operation information from each of a plurality of vehicles including the vehicles 1 and 4. For example, when the management server 7 requests the operation information from the vehicle 1 via the communication device 10, the central ECU 321 of the vehicle 1 receives the request signal from the management server 7 via the DCM 327. The central ECU 321 acquires the operation information from the computer 21 of the ADK 2 or the memory of the central ECU 321, for example, and transmits the acquired operation information to the management server 7 via the DCM 327.

At S104, the management server 7 sets the traveling route for each of the plurality of vehicles. For example, when the operation information of any one of the plurality of vehicles includes information indicating that maintenance is required, the management server 7 sets the traveling route of the vehicle as the forwarding route. The management server 7 sets the traveling route other than the vehicle set as the forwarding route to the normal traveling route. The management server 7 sets a flag associated with the vehicle for which the forwarding route is set to an ON state, and stores the set flag in the storage device 9 in association with the vehicle ID.

In S106, the management server 7 determines whether there is a vehicle for which the forwarding route is set among the plurality of vehicles. The management server 7 determines that there is a vehicle for which the forwarding route is set when there is a vehicle for which the flag is set to the ON state among the plurality of vehicles. When it is determined that there is a vehicle with the forwarding route set (YES at S106), the process proceeds to S108.

At S108, the management server 7 calculates the accumulated amount of the load of each vehicle for which the forwarding route is set. The management server 7 calculates the accumulated amount of the load by using information that is at least one a plurality of pieces of information that are the traveling distance, the traveling time, the vehicle weight, the total number of passengers, the traveling distance until the next maintenance is performed, and the traveling time unit the next maintenance is performed. In this way, the accumulated amount of the load can be calculated with high accuracy.

The management server 7 calculates the accumulated amount in two stages including, for example, a high accumulation state and a low accumulation state. For example, when the traveled distance (or the traveled time or the total number of passengers) is equal to or greater than a threshold value, the management server 7 may set a state to a high accumulation state, and when the traveled distance is shorter (smaller) than the threshold value, the management server 7 may set a state to a low accumulation state. At this time, the management server 7 may change the threshold according to the vehicle weight (for example, the heavier the vehicle weight, the lower the threshold). Alternatively, the management server 7 may set a state to the high accumulation state when the travel distance (or travel time) until the next maintenance is performed is equal to or less than the threshold, and may set a state to a low accumulation state when the travel distance is longer than the threshold.

Alternatively, the management server 7 may calculate the accumulated amount in three stages or more by setting a plurality of thresholds, for example. Alternatively, the management server 7 may calculate, for example, the accumulated amount shown as a percentage. For example, the management server 7 may use at least one of the plurality of pieces of travel history information to calculate the basic value of the accumulated amount, may use the other travel history information to set the correction coefficient, and may calculate the accumulated amount expressed as the percentage by correcting the basic value by using a correction factor. For example, the management server 7 associates the calculated accumulated amount with the vehicle ID of the corresponding vehicle and stores them in the storage device 9. After that, the process moves to S110.

In S110, the management server 7 determines whether there is a vehicle with the high accumulation state among the vehicles for which the forwarding route is set. When it is determined that there is a vehicle in the high accumulation state (YES in S110), the process proceeds to S112.

In S112, the management server 7 sets the cancellation contents of the travel restriction in accordance with the accumulated amount of the load of the vehicle on the forwarding route. For example, the management server 7 cancels the travel restriction on the vehicle determined to be in the low accumulation state among the vehicles for which the forwarding route is set. On the other hand, for example, for the vehicle determined to be in the high accumulation state among the vehicles for which the forwarding route is set, the management server 7 sets the cancellation content in which at least one restriction item among a plurality of restriction items constituting travel restrictions is cancelled. The plurality of restriction items include, for example, a restriction item for the driving force, a restriction item for the braking force, and a restriction item for the steering force. The upper limit value described above is an example of the restriction item.

For example, when the number of times of steering in which the steering angle to the maintenance facility is equal to or greater than a predetermined angle on the forwarding route is equal to or greater than a threshold value, the management server 7 may set the cancellation content to cancel only the restriction items for the driving force and the braking force without cancelling the restriction item for the steering force.

For example, when the number of times of steering on the forwarding route is less than the threshold value, the management server 7 may set the content to the cancellation content that does not cancel the restriction on the driving force and the braking force and that only cancels the steering force.

Alternatively, when the travel distance to the maintenance facility on the forwarding route is equal to or greater than the threshold value, the management server 7 may set the content to the cancellation content that does not cancel the restriction items for the driving force and the braking force and that only cancels the restriction items for the steering force.

Alternatively, the management server 7 may not cancel the restriction item on the driving force when the high accumulation state is caused by the load of the drive system, may not cancel the restriction item on the braking force when the high accumulation state is caused by the load of the braking system, or may not cancel the restriction item on the operation force when the high accumulation state is caused by the load of the operation system, or Furthermore, the management server 7 may not cancel any restriction items for the vehicle determined to be in the high accumulation state. After that, the process moves to S116. On the other hand, when it is determined that there is no vehicle in the high accumulation state (NO in S110), the process proceeds to S114.

In S114, the management server 7 sets the cancellation of the travel restrictions for the vehicle on the forwarding route. That is, the management server 7 sets the cancellation content for canceling the restriction items of the driving force, the braking force, and the steering force. After that, the process moves to S116.

At S116, the management server 7 transmits the travel plan information to the each vehicle. The management server 7, for example, sets information such as the departure and arrival times at the boarding/alighting point on the traveling routes of vehicles set for the normal traveling route and the forwarding route, and the cancellation of the travel restriction for the vehicle traveling on the forwarding route. The management server 7 transmits the set information as the travel plan information to each of the plurality of vehicles. When the execution condition is not met (NO at S100), this process is terminated. Further, when it is determined that there is no vehicle set for the forwarding route (NO in S106), the process proceeds to S116.

An example of the operation of the management server 7 based on the above structure and flowchart will be described with reference to FIG. 4.

Figure 4:
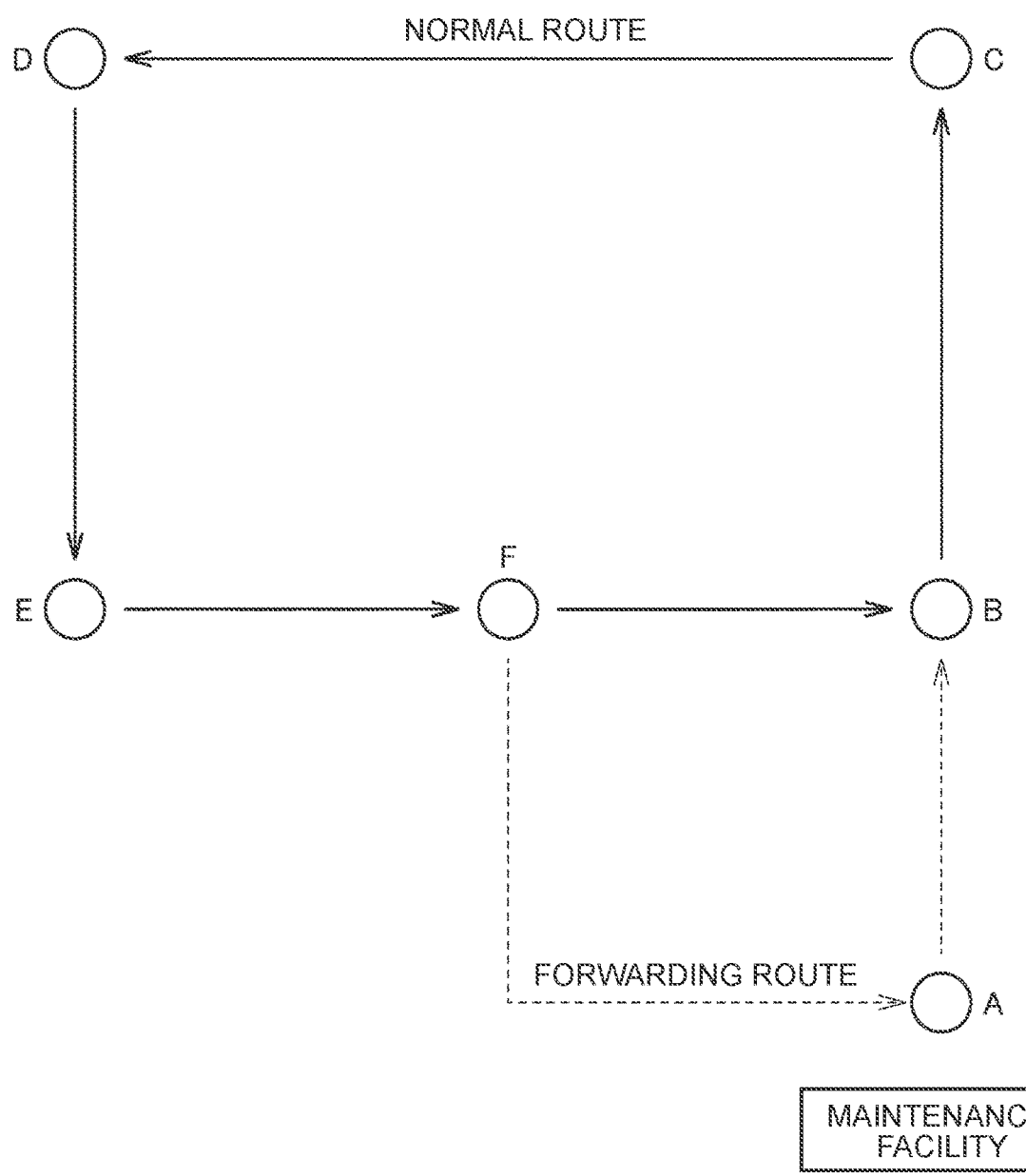
FIG. 4 is a diagram for describing a normal traveling route and a forwarding route.

FIG. 4 is a diagram for describing the normal traveling route and the forwarding route. As shown in FIG. 4, the forwarding route includes the location of the maintenance facility. (A) to (F) of FIG. 4 show boarding/alighting points.

For example, it is assumed that the vehicle 1 of the plurality of vehicles is determined to be in a state requiring maintenance by the self-diagnostic processing.

At this time, in the management server 7, it is determined that the execution condition is established when a predetermined time has elapsed since the previous setting of the traveling plan information (YES in S100).

Thus, the operation information is acquired from each of the plurality of vehicles (S102). The traveling route is set by using the acquired operation information (S104). At this time, in the vehicle 1, the forwarding route is set as the traveling route, and the corresponding flag is set to the ON state.

Since the flag corresponding to the vehicle 1 of the plurality of vehicles is set to the ON state, it is determined that there is a vehicle on the forwarding route (YES at S106). Therefore, the accumulated amount of the load of the vehicle 1 on the forwarding route is calculated (S108), when it is determined that the vehicle 1 on the forwarding route is in the high accumulation state (YES at S110), the cancellation content of the travel restriction is set in accordance with the accumulated amount of load on the vehicle 1 on the forwarding route (S112), and the travel plan information including the set cancellation content is transmitted to the vehicle 1 (S116). That is, the cancellation content that cancels at least one restriction item of the plurality of restriction items is set.

As shown in FIG. 4, in a state in which the traveling restriction is performed, the vehicle for which a traveling route other than the forwarding route (normal route) is set moves between each boarding/alighting point in the order of (B), (C), (D), (E), and (F) in FIG. 4 and returns to (B), and circulates.

On the other hand, the vehicle 1 for which the forwarding route is set moves from the boarding/alighting point of (F) in FIG. 4 to the boarding/alighting point set at (A) of the maintenance facility. The forwarding route includes at least the moving route from (F) to (A) in FIG. 4. The forwarding route may include a moving route from (A) to (B). Any one of (B) to (F) in FIG. 4 may be used as the starting point of the forwarding route. When the vehicle 1 travels the forwarding route including (A) of FIG. 4, the vehicle 1 continues traveling without part or all of the travel restrictions being canceled, when the vehicle 1 is in the high accumulation state. Therefore, even when the user does not get on the vehicle in the forwarding route, it is possible to suppress further load from being applied to the parts in the highly accumulated state due to the traveling restrictions.

When it is determined that the vehicle 1 for which the forwarding route is set is in the low accumulation state (NO at S110), the cancellation of the travel restriction on the vehicle 1 on the forwarding route is set (S114), and the travel plan information is transmitted to the vehicle 1 (S116). As a result, since the travel restriction is canceled, the vehicle can quickly move to the location of the maintenance facility or quickly move from the maintenance facility to the boarding/alighting point shown in (B) in FIG. 4.

As described above, according to the vehicle management system according to the present embodiment, it is possible to cancel the travelling restriction in accordance with the content corresponding to the accumulated amount of load on the vehicle. In particular, since the content of the cancellation is set so that the travel restriction is maintained when the accumulated amount of the load is high, it is possible to further suppress an increase in the accumulated amount of the load. As a result, it is possible to suppress an increase in the possibility of an occurrence of a failure. It is possible to provide a vehicle management system that suppresses an increase in the possibility of a failure occurring in a vehicle used to provide services.

Hereinafter, modifications will be described.

In the above-described embodiment, the case where the user does not board the vehicle on the forwarding route has been described as an example. However, the user may board the vehicle on the forwarding route as well. In this case, the management server 7 may request the cancellation of travelling restrictions according to the accumulated state when the user is not on board. In this way, it is possible to quickly move the unmanned vehicle to the place where maintenance is to be performed, and to suppress deterioration of ride comfort when the vehicle is manned. Therefore, it is possible to suppress an increase in the time during which the service cannot be provided. Further, at this time, when the management server 7 determines that the vehicle is in the high accumulation state, the management server 7 may not request the cancellation of the travel restriction regardless of whether the user is in the vehicle. By doing so, it is possible to suppress a further increase in the accumulated amount of load, thereby suppressing an increase in the risk of failure occurrence.

Furthermore, in the above-described embodiment, the position detection device of the vehicle 1 is provided in the ADK 2 as an example. However, the position detection device may be provided in the VP 3.

Furthermore, in the above-described embodiment, it is described that the traveling restriction is canceled on the forwarding route in accordance with the amount of the accumulated amount of the load, and the traveling restriction is maintained on the normal route. However, the upper limit of the movement speed may be changed in the forwarding route and the normal route.

Furthermore, in the above-described embodiment, it has been described that the travel restrictions are canceled in accordance with the accumulated amount of the load on the forwarding route. However, for example, the accumulated amount of the load may be reset to the initial value (such as zero) after the maintenance. In this way, even when it is determined that the state in the high accumulation state before maintenance, since the state will be the low accumulation state after maintenance, the state will be such that the travelling restriction is canceled and the travel time can be shortened.

In addition, the above-mentioned modifications may be carried out by appropriately combining all or a part thereof. The embodiment disclosed herein should be considered to be exemplary and not restrictive in all respects. The scope of the present disclosure is shown by the scope of claims rather than the description above, and is intended to include all modifications within the meaning and the scope equivalent to the scope of claims.

What is claimed is:

1. A vehicle management system comprising:
a vehicle that is able to perform autonomous driving and that is used to provide a transportation service; and
a server that is able to communicate with the vehicle, wherein the server:
requests a predetermined travel restriction for the vehicle during the autonomous driving when a user of the transportation service is on board,
requests an adjustment of the travel restriction when the user is not on board, and
calculates an accumulated amount of a load acting on the vehicle, and uses the calculated accumulated amount to set content of the adjustment of the travel restriction that is requested when the user is not on board, wherein:
the server requests the adjustment of the travel restriction when the user is not on board the vehicle traveling on a predetermined traveling route that includes a place where maintenance of the vehicle is performed,
the server restricts one of a driving force of the vehicle, a braking force of the vehicle, and a steering force of the vehicle in accordance with the travel restriction that is requested, and
the server sets a predetermined upper limit value and controls the driving force of the vehicle, the braking force of the vehicle, and the steering force of the vehicle in accordance with the travel restriction that is requested so that at least one of the driving force of the vehicle, the braking force of the vehicle, and the steering force of the vehicle does not exceed the predetermined upper limit value.

2. The vehicle management system according to claim 1, wherein when the accumulated amount is high, the server sets the content of the adjustment of the travel restriction such that the travel restriction is maintained more than when the accumulated amount is low.

3. The vehicle management system according to claim 2, wherein when a state is a predetermined state in which the accumulated amount of the vehicle is high, the server does not request the adjustment of the travel restriction even when the user is not on board.

4. The vehicle management system according to claim 1, wherein the server calculates the accumulated amount by using at least one of a travel distance of the vehicle, a travel time of the vehicle, a number of passengers in the vehicle, a travel distance until a next maintenance is performed, and a travel time until the next maintenance is performed.

* * * * *